(12) United States Patent
Wang

(10) Patent No.: US 9,175,974 B2
(45) Date of Patent: Nov. 3, 2015

(54) POI DISPLAYING METHOD AND ELECTRONIC APPARATUS UTILIZING THE METHOD

(75) Inventor: Chunyan Wang, Anhui (CN)

(73) Assignee: AUTOCHIPS INC., Hefei, Anhui Province (CN)

( * ) Notice: Subject to any disclaimer, the term of this patent is extended or adjusted under 35 U.S.C. 154(b) by 1674 days.

(21) Appl. No.: 12/518,108

(22) PCT Filed: May 8, 2009

(86) PCT No.: PCT/CN2009/071702
§ 371 (c)(1),
(2), (4) Date: Jun. 8, 2009

(87) PCT Pub. No.: WO2010/127505
PCT Pub. Date: Nov. 11, 2010

(65) Prior Publication Data
US 2011/0258827 A1 Oct. 27, 2011

(51) Int. Cl.
| | | |
|---|---|---|
| B23P 11/00 | (2006.01) | |
| G01C 21/36 | (2006.01) | |
| G01C 21/34 | (2006.01) | |
| H04W 4/02 | (2009.01) | |
| H04L 29/08 | (2006.01) | |

(52) U.S. Cl.
CPC ........ *G01C 21/3644* (2013.01); *G01C 21/3476* (2013.01); *H04L 67/18* (2013.01); *H04L 67/36* (2013.01); *H04W 4/02* (2013.01); *H04W 4/026* (2013.01); *Y10T 29/49826* (2015.01)

(58) Field of Classification Search
CPC . G01C 21/3476; G01C 21/3644; H04W 4/02; H04W 4/026; Y10T 29/49826; H04L 67/36; H04L 67/18

USPC .......................................................... 701/208
See application file for complete search history.

(56) References Cited

U.S. PATENT DOCUMENTS

| | | | | |
|---|---|---|---|---|
| 5,802,492 A | * | 9/1998 | DeLorme et al. | 455/456.5 |
| 8,423,285 B2 | * | 4/2013 | Paterson et al. | 701/408 |
| 2004/0259573 A1 | * | 12/2004 | Cheng | 455/456.3 |
| 2005/0085999 A1 | * | 4/2005 | Onishi | 701/211 |
| 2008/0082262 A1 | * | 4/2008 | Silva et al. | 701/211 |

(Continued)

FOREIGN PATENT DOCUMENTS

| | | | |
|---|---|---|---|
| CN | 101196407 A | 6/2008 | |
| CN | 101201255 A | 6/2008 | |

(Continued)

OTHER PUBLICATIONS

International application No. PCT/CN2009/071702,International filing date: May 8, 2009,International Search Report mailing date: Feb. 25, 2010, 9 pages.

*Primary Examiner* — Tuan C. To
(74) *Attorney, Agent, or Firm* — Cheng-Ju Chiang

(57) ABSTRACT

One embodiment of the present application discloses an POI displaying method for displaying information of at least one POI (point of interest) stored in a database on an electronic apparatus. The method comprises: (a) obtaining at least one POI according to a desired POI type; (b) obtaining at least one corresponding path according to the position of each obtained POI; (c) generating a POI gathering information of each corresponding path according to the at least one obtained POI; and (d) displaying the at least one corresponding path and the corresponding POI gathering information.

14 Claims, 9 Drawing Sheets

(56) References Cited

U.S. PATENT DOCUMENTS

2008/0249701 A1* 10/2008 Zhuang .................. 701/200
2009/0098882 A1* 4/2009 Yoon .................. 455/456.1
2009/0098888 A1* 4/2009 Yoon .................. 455/456.2
2009/0171576 A1* 7/2009 Kim et al. .................. 701/209
2010/0005135 A1* 1/2010 Yang .................. 709/203
2010/0198494 A1* 8/2010 Chao et al. .................. 701/200
2010/0228474 A1* 9/2010 Paterson et al. .................. 701/208

FOREIGN PATENT DOCUMENTS

JP 2004355075 A * 12/2004
TW 200829871 7/2008

* cited by examiner

| Searching Result | | |
|---|---|---|
| Name | Address | Distance |
| Gene Car Center | Huang Shan Road No.179 | 0.5 Km |
| Wenes Car Repairing | Guan Nin Road No.428 | 1.8 Km |
| HELI Car Service | Wei Chin Street No.185 | 3.7 Km |
| ... | ... | ... |

| Searching Result | | | | |
|---|---|---|---|---|
| Road | Amount | Density | Nearest | Mostfar |
| Huang Shan Road | 20 | 0.59/Km | 0.2Km | 12 Km |
| Hai Chin Road | 5 | 1.32/Km | 0.4Km | 2.2Km |
| Shon Gian Street | 4 | 0.55/Km | 0.8Km | 3Km |
| Lian Pin Road | 1 | 1/Km | 1Km | 1Km |
| Science Road | 8 | 0.96/Km | 1.2Km | 9Km |
| ⋮ | | ⋮ | | ⋮ |

FIG. 4

POI DISPLAYING METHOD AND ELECTRONIC APPARATUS UTILIZING THE METHOD

FIELD OF INVENTION

The present invention relates to a POI (point of interest) displaying method and an electronic apparatus utilizing the method, and particularly relates to a POI displaying method, which utilizes POI of desired type to search path, and an electronic apparatus utilizing the method.

BACKGROUND OF THE INVENTION

FIG. 1 is a related art POI searching method utilized on a navigator. The searching window displayed on the navigator can include a plurality of icons indicating different searching methods. In this example, the type searching icon 101, the name searching icon 103, and the neighbor searching icon 105 are displayed on a displaying unit 107, and the type searching icon 101 is activated (ex. via a touch screen), as shown in FIG. 1(a). After the type searching icon 101 is activated, icons 109~123 for different POI types is displayed on the displaying screen 107, as shown in FIG. 1(b). In this case, the icon 113, which is for car service, is activated.

After the icon 113 is activated, the POI information will be displayed on the displaying unit 107, as shown in FIG. 2. However, such POI information only discloses the location and the distance of the POI, but can not indicate the gathering situation of the POI. If the user can go to a path which has many POIs of the type he is searching for, not only the user will feel more convenient, but also the user can compare the product quality and cost of many POIs. Therefore, a method or a system for displaying the gathering information of POI is needed.

SUMMARY OF THE INVENTION

Therefore, one objective of the present invention is to provide a POI displaying method and an electronic apparatus that can display the gathering information of POI.

One embodiment of the present application discloses an POI displaying method for displaying information of at least one POI (point of interest) stored in a database on an electronic apparatus. The method comprises: (a) obtaining at least one POI according to a desired POI type; (b) obtaining at least one corresponding path according to the position of each obtained POI; (c) generating a POI gathering information of each corresponding path according to the at least one obtained POI, and (d) displaying the at least one corresponding path and the corresponding POI gathering information.

Another embodiment of the present application discloses an electronic apparatus for displaying information of at least one POI (point of interest), comprising: a first storage unit, for storing a plurality of POIs; a second storage unit, for storing a map information which comprising a plurality of paths; a processing unit, for obtaining at least one POI according to a desired POI type, for obtaining at least one corresponding path according to the position of each obtained POI, and for generating a POI gathering information of each path according to the at least one obtained POI; and a displaying unit, for displaying the at least one path and the corresponding POI gathering information. According to above-mentioned description, the gathering information of the POI can be computed and displayed according to the instruction of the user, thus the disadvantage of related art can be avoided.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-2 are schematic diagrams illustrating a related art POI displaying method.

FIGS. 3-5 are schematic diagrams illustrating a POI displaying method according to a preferred embodiment of the present application.

DETAILED DESCRIPTION

Figure 1:
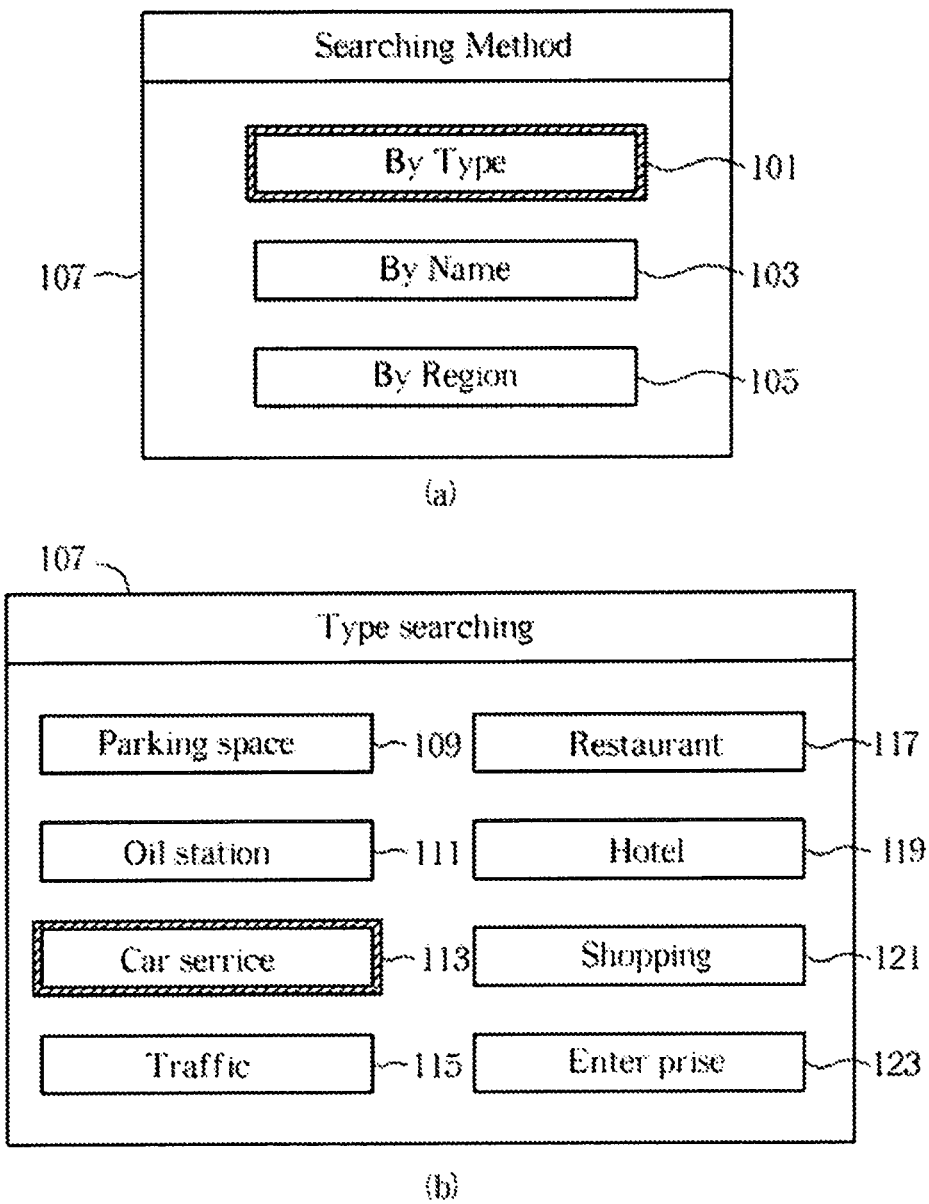
Figure 3:
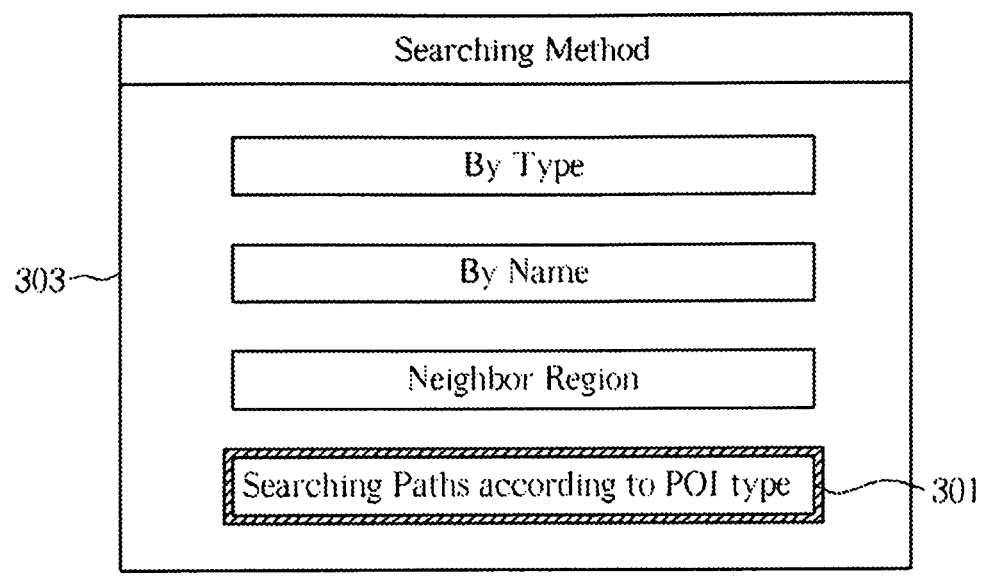
Figure 5:
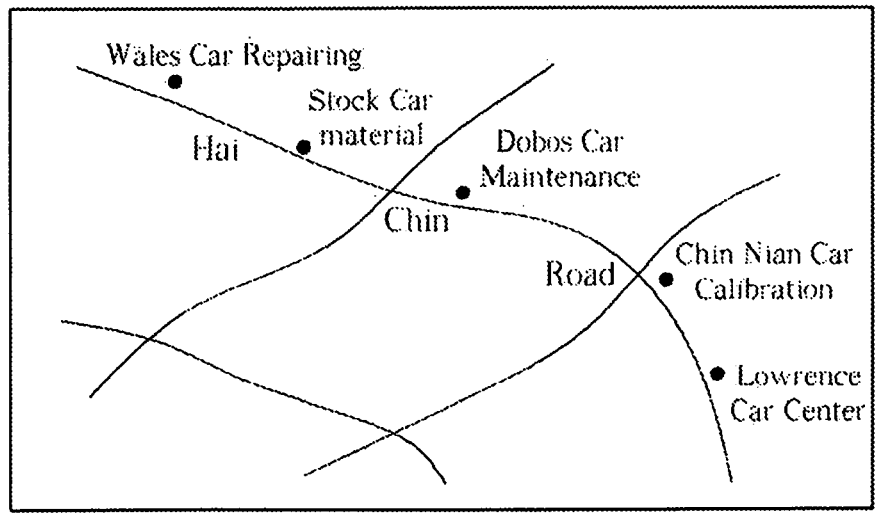

FIGS. 3-5 are schematic diagrams illustrating a POI displaying method according to a preferred embodiment. In this case, an extra icon 301, which is for searching paths according to desired POI type, is provided on the displaying unit 303. Please refer to FIG. 1(b) again, after the icon 301 is activated, icons for different types are displayed on the displaying screen, the same as FIG. 1(b). In this case, the icon 113, which is for car service, is also activated.

After the icon 113 is activated, POIs of the selected type are searched first, then paths are searched according to POIs of the selected type and searching index is generated accordingly and displayed on the displaying unit 401, as shown in FIG. 4. The searching range can be limited to a particular range of the user (i.e. a target object which is located by the navigator), but it does not mean to limit the scope of the present invention. In FIG. 4, a road region 402, an amount region 403, a density region 405, a shortest distance region 407, and a longest distance region 409. The road region 401 indicates the name of the road (or called a path) having at least one POI of the desired type. The amount region 403 indicates the amount of the POI of the desired type. The density region 405 indicates the distribution density of the POI of the desired type on the road. The shortest distance region 407 indicates a distance between a nearest POI and the user. Similarly, longest distance region 409 indicates a distance between a most far POI and the user.

Take Hai Chin Road for example, there are 5 POIs of car service thereon, each KM having 1.32 POI of car service for average, the nearest POI of car service having a distance of 0.4 km from the user, and the most far POI of car service having a distance of 2.2 km from the user. Hai Chin Road can be selected to see more detail information (the POI-Path index). After Hai Chin Road is selected, POI-Path index is displayed in FIG. 5. In FIG. 5(a), the name for each POI of car service on Hai Chin Road and the distance from the user is displayed. Alternatively, the detail information for POIs of car service on Hai Chin Road can be displayed as in FIG. 5(b). In FIG. 5(b), Hai Chin Road and the POIs of car service on Hai Chin Road are both displayed on the map. According to the POI gathering information shown in FIGS. 4 and 5, a path can be selected as a destination.

Figure 6:
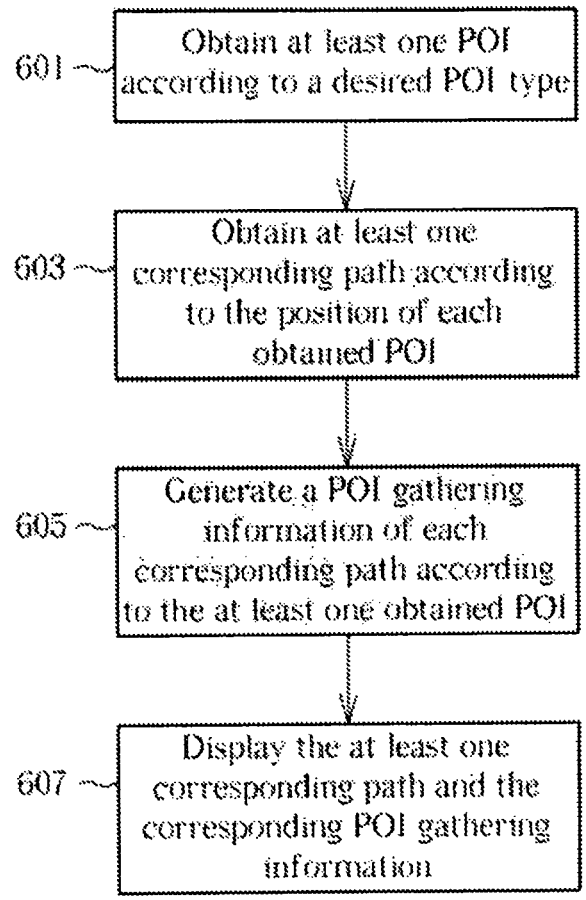
FIG. 6 illustrates a flow chart for a POI displaying method according to a preferred embodiment of the present application.

Summarizing the embodiments shown in FIG. 3 to FIG. 5, a POI displaying method according to one embodiment of the present invention can be indicated as the steps shown in FIG. 6. It should be noted that the embodiments shown in FIGS. 3-6 are only for example but do not mean to limit the scope of the present invention.

FIG. 6 includes the steps of:

Step 601

Obtain at least one POI according to a desired POI type.

Step 603

Obtain at least one corresponding path according to the position of each obtained POI.

Step 605

Generate a POI gathering information (ex. the information shown in regions 403-409 of FIG. 4) of each corresponding path according to the at least one obtained POI.

Step 607

Display the at least one corresponding path and the corresponding POI gathering information (ex. as shown in FIGS. 4 and 5).

Figure 7:
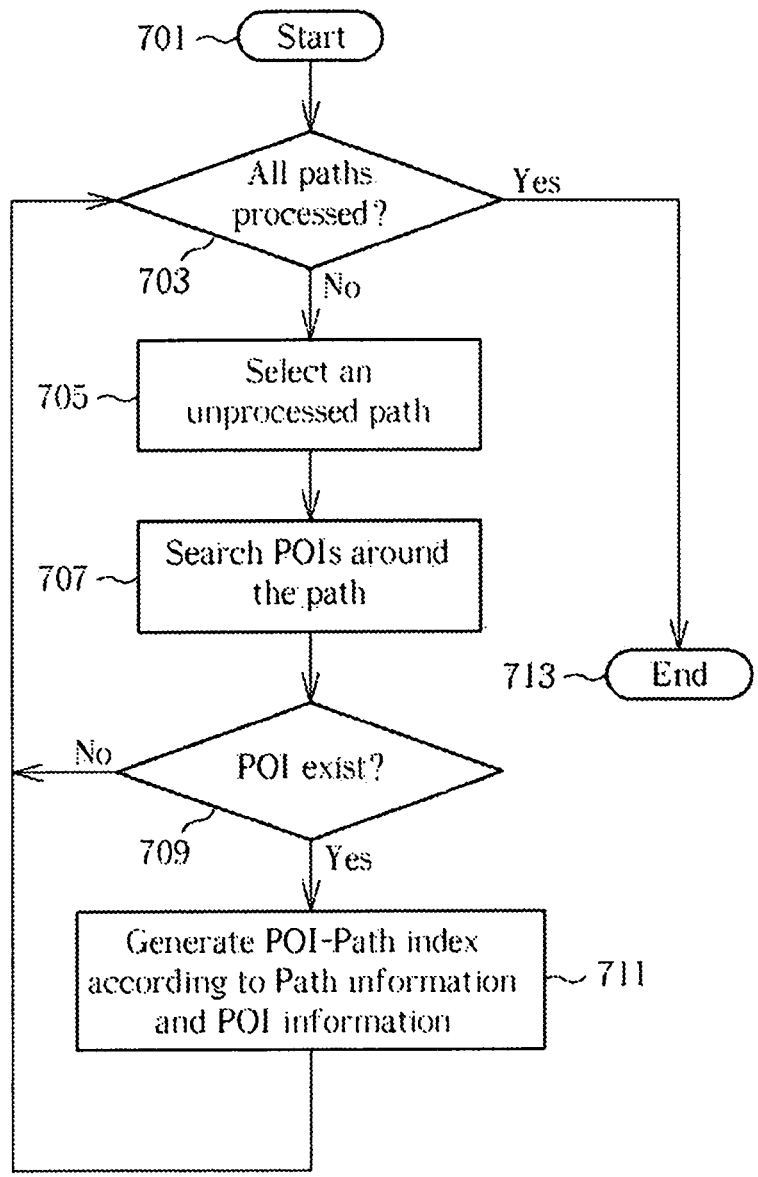
FIG. 7 is a flow chart illustrating the steps for generating POI-Path index.
Figure 8:
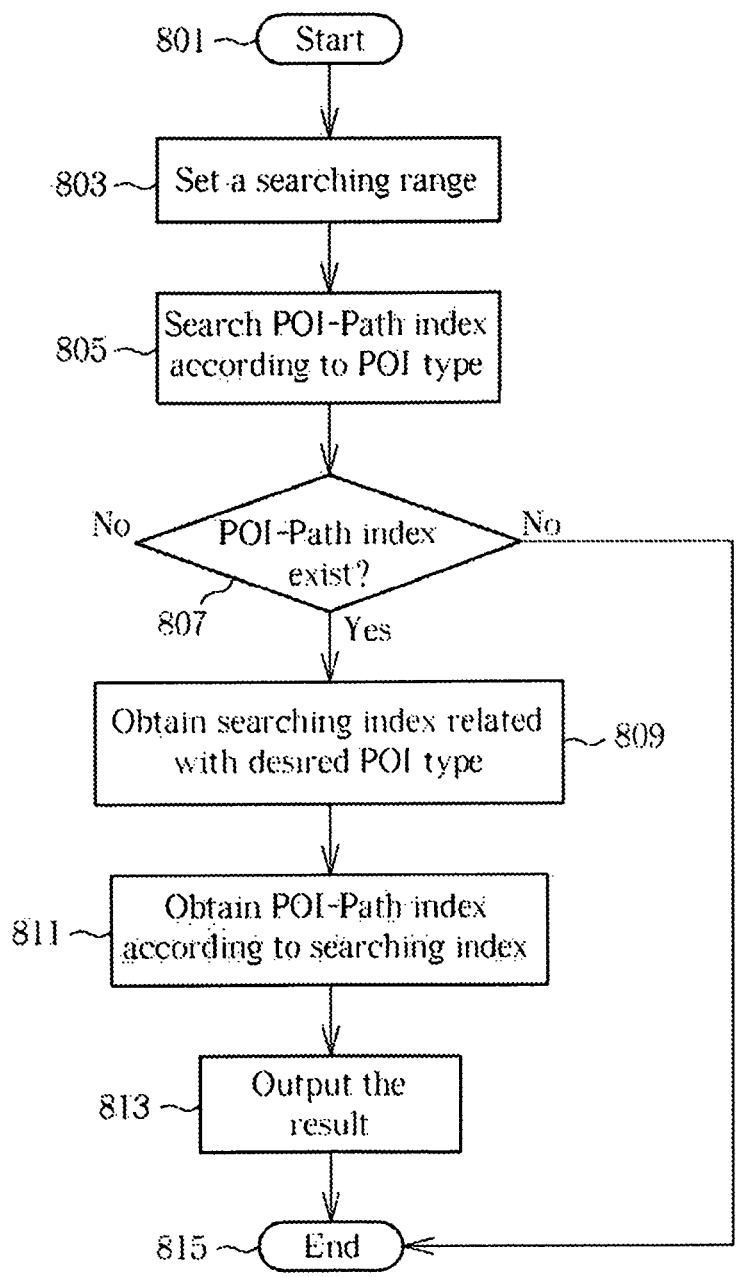
FIG. 8 is a flow chart illustrating the steps for obtaining POI-Path index according to desired POI type.

Besides generating the POI-Path index in real time, the POI-Path index can be generated and stored in the data base initially, as shown in FIG. 7 and FIG. 8. FIG. 7 is a flow chart illustrating the steps for generating POI-Path index according to one embodiment of the present invention. FIG. 8 is a flow chart illustrating the steps for obtaining POI-Path index according to desired POI type according to one embodiment of the present invention. Please note that the steps shown in FIG. 7 and FIG. 8 are only for example and do not mean to limit the scope of the present invention.

As shown in FIG. 7, the steps for generating POI-Path index include:

Step 701

Start.

Step 703

Determine if all paths are processed? If yes, go to step 713. If not, go to step 705.

Step 705

Select an unprocessed path and process the unprocessed path.

Step 707

Search POIs around the path.

Step 709

Determine if there any POI exists? If yes, go to step 711. If not, go back to step 703.

Step 711

Generate POI-Path index (i.e. the information displayed in FIG. 5 (a)) according to path information and POI information.

Step 713

End.

As shown in FIG. 8, the steps for generating POI-Path index include:

Step 801

Start

Step 803

Set a searching range. For example, the searching range can be a specific range around the user.

Step 805

Search POI-Path index according to desired POI type.

Step 807

Determine if there any POI-Path index exist?

Step 809

Obtain searching index (i.e. the information displayed in FIG. 4) related with desired POI type.

Step 811

Obtain POI-Path index (i.e. the information displayed in FIG. 5 (a)) according to searching index.

Step 813

Output the searching result.

Step 815

End.

Figure 9:
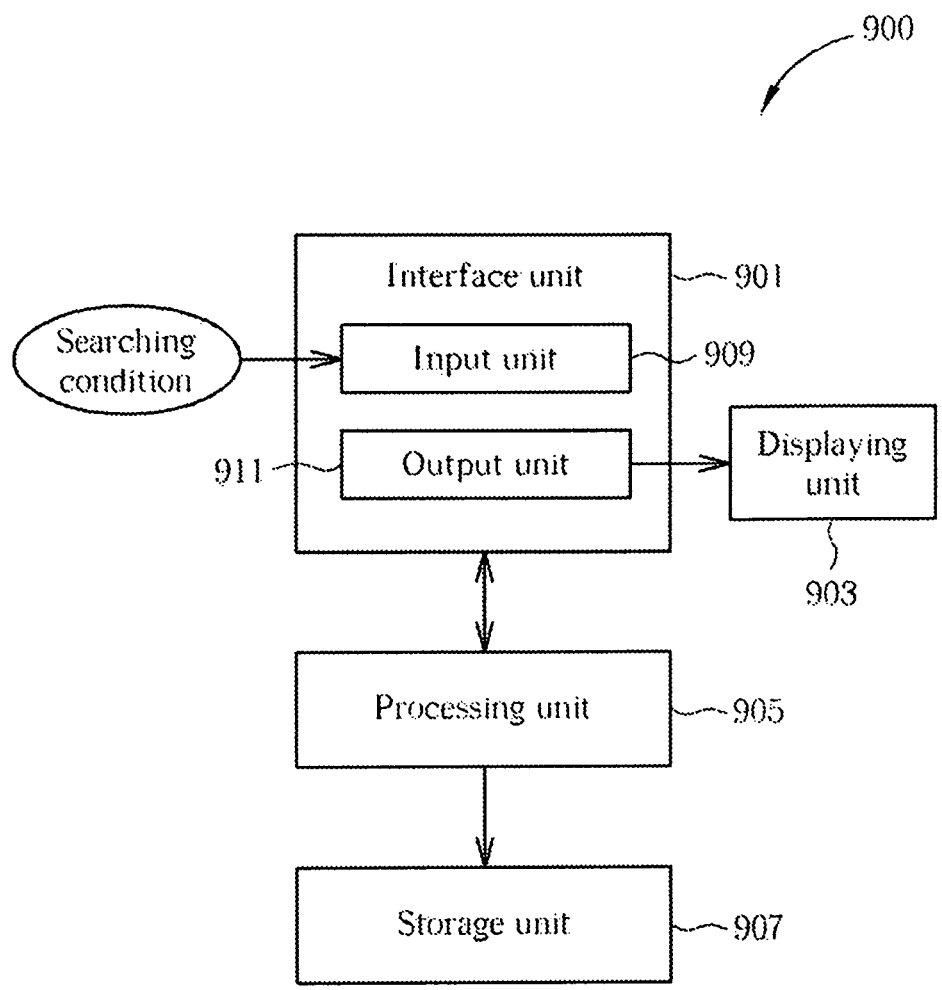
FIG. 9 is a block diagram a POI information displaying electronic apparatus according to an embodiment of the present invention.

FIG. 9 is a block diagram a POI information displaying electronic apparatus 900 according to an embodiment of the present invention. As shown in FIG. 9, the POI information displaying electronic apparatus 900 includes an interface unit 901, a displaying unit 903, a processing unit 905, and a storage unit 907. The storage unit 907 can be regarded as a data base, for storing at least one POI and map information. The processing unit 905 obtains at least one POI according to a desired POI type, obtains at least one corresponding path according to the position of each obtained POI, and generates a POI gathering information of each corresponding path according to the at least one obtained POI. That is, the processing unit 905 searches searching index according to a desired POI type. The displaying unit 903 displays the at least one corresponding path and the corresponding POI gathering information. That is, the displaying unit 903 displays the searching index or POI-Path index, as shown in FIG. 4 or 5. In this case, the interface unit 901 further includes an input unit 909 to receive the desired POI type, and an output unit 911 to output related data to the displaying unit 903. However, it does not mean to limit the scope of the present invention, the interface unit 901 can have other structures according to different requirement or even be omitted.

It should be noted that the embodiment shown in FIG. 9 does not mean that the POI displaying method according to the embodiment of the present invention only can be used on the apparatus shown in FIG. 8. Besides, the above-mentioned method and apparatus not only can be applied to a navigator but also can be applied to other apparatuses.

According to above-mentioned description, the gathering information of the POI can be computed and displayed according to the instruction of the user, thus the disadvantage of related art can be avoided.

Those skilled in the art will readily observe that numerous modifications and alterations of the device and method may be made while retaining the teachings of the invention.

The invention claimed is:

1. A POI displaying method for displaying information of at least one POI stored in a database on an electronic apparatus, comprising:
    (a) obtaining at least one POI according to a desired POI type;
    (b) obtaining at least one corresponding path according to the position of each obtained POI;
    (c) generating a POI gathering information of each corresponding path according to the at least one obtained POI; and
    (d) displaying the at least one corresponding path and the corresponding POI gathering information.

2. The method of claim 1, wherein the step (d) comprises displaying the amount of the POI on the corresponding path.

3. The method of claim 1, wherein the step (d) comprises displaying the distribution density of the POI of the corresponding path.

4. The method of claim 1, further comprising the following step:
    locating a target object, and
    wherein the step (d) further comprises displaying at least one of a shortest distance between the target object and a nearest POI of the corresponding path and a longest distance between the target object and a most far POI of the corresponding path.

5. The method of claim 1, further comprising the following step:

selecting one of the corresponding path as a destination.

6. The method of claim 1, further comprising the following steps:

displaying the selected path on a map stored in the data base; and displaying the POI of the selected path on the map.

7. The method of claim 1, further comprising:

locating a target object;

wherein the step (a) searches the POI in a predetermined range of the target object.

8. An electronic apparatus for displaying information of at least one POI, comprising:

a first storage unit, for storing a plurality of POIs;

a second storage unit, for storing a map information which comprising a plurality of paths;

a processing unit, for obtaining at least one POI according to a desired POT type, for obtaining at least one corresponding path according to the position of each obtained POI, and for generating a POI gathering information of each path according to the at least one obtained POI; and a displaying unit, for displaying the at least one path and the corresponding POT gathering information.

9. The electronic apparatus of claim 8, wherein the displaying unit displays the amount of the POT on the corresponding path.

10. The electronic apparatus of claim 8, wherein the displaying unit displays the distribution density of the POT of the corresponding path.

11. The electronic apparatus of claim 8, wherein the processing unit further locates a target object, where the displaying unit further displays at least one of a shortest distance between the target object and a nearest POI of the corresponding path and a longest distance between the target object and a most far POI of the corresponding path.

12. The electronic apparatus of claim 8, wherein the processing unit further selects one of the corresponding paths as a destination.

13. The electronic apparatus of claim 8, wherein the storage unit further stores a map, where the displaying unit displays the selected path on the map and displays the POT of the specific type on the target path on the map.

14. The electronic apparatus of claim 8, wherein the processing unit further locates a target object, where the processing unit searches the POI in a predetermined range of the target object.

* * * * *